United States Patent [19]

Dill

[11] 4,441,651
[45] Apr. 10, 1984

[54] HYDRAULIC FAN CONTROL

[75] Inventor: Terry A. Dill, Keota, Iowa

[73] Assignee: Jefferson Industries Company, Fairfield, Iowa

[21] Appl. No.: 437,887

[22] Filed: Oct. 29, 1982

[51] Int. Cl.³ .............................................. F24F 7/00
[52] U.S. Cl. .................................... 236/49; 98/33 R; 60/468; 91/532; 417/46
[58] Field of Search .......................... 417/46, 47, 490; 236/49; 98/33 R; 91/516, 532; 60/468

[56] References Cited

U.S. PATENT DOCUMENTS

| | | | |
|---|---|---|---|
| 2,467,398 | 4/1949 | Miller | 417/46 X |
| 2,927,429 | 3/1960 | Carlson | 60/468 X |
| 3,000,290 | 9/1961 | Rodick et al. | 98/33 R |
| 3,072,058 | 1/1963 | Christopher et al. | 417/47 X |
| 3,507,601 | 6/1970 | Courchesne | 98/33 R |
| 3,537,259 | 11/1970 | Gordon et al. | 60/468 X |
| 3,760,688 | 9/1973 | Dummer | 91/532 X |
| 3,915,377 | 10/1975 | Sutton, Jr. | 98/33 R X |

*Primary Examiner*—William E. Tapolcai
*Attorney, Agent, or Firm*—Rudolph L. Lowell

[57] ABSTRACT

A hydraulic fan control for controlling air ventilation in a building having a plurality of fans operated by associated hydraulic motors which are connected in parallel and driven by a single pump and electric motor unit through a hydraulic fluid circuit. The speed of the fans is proportional to the volume of fluid flowing through the associated hydraulic motors per unit time, i.e., the rate of fluid flow. The volume of fluid is regulated by a shunt flow divider valve included in the hydraulic circuit and connected in parallel with the hydraulic motors. The shunt flow divider valve is in turn controlled by an electrical drive circuit responsive to variations in the ambient temperature of the air in the building. The electrical circuit provides generally stepwise increases or decreases in the hydraulic flow to each fan motor and, therefore, governs fan speed to adjust the air flow within the building and the exchange of air with the atmosphere exterior to the building thereby maintaining the building temperature at or near a chosen temperature level.

9 Claims, 7 Drawing Figures

HYDRAULIC FAN CONTROL

BACKGROUND OF THE INVENTION

Many systems for forced air ventilation using thermostatically controlled fans are known in the prior art. Generally, the fans are driven by electric motors which are either switched fully on or fully off. The losses associated with this switching action increases the energy required to operate these systems. Additionally, mechanical shutters or air bypasses are used to limit or to divert the air flow while the fans operate at maximum speed. Such shutter systems are uneconomical because energy is wasted moving air which is not used directly for ventilation purposes.

For example, U.S. Pat. Ser. No. 2,963,225 (Shelton, 1960) shows the use of thermostats and timers to control motor driven louvers which are used to restrict air flow through ventilating registers.

Alternatively, potentiometers are used to vary the voltage applied to electric motors, as in U.S. Pat. Ser. No. 2,351,695 (Newton, 1944). Adjustment in voltage produced by the potentiometer acts to vary the speed of the electric motors, but the potentiometer also causes uneconomical resistive losses. Solid-state devices such as silicon-controlled rectifiers are also used in the prior art to control the speed of electric motors by limiting the applied voltage. The rectifiers eliminate the resistive losses of the potentiometer, but deform the sinusoidal wave form of the alternating current used to drive the motors. Electrical losses thus occur because the wave form no longer coincides with that on which the electric motor was designed to operate.

The system of the present invention eliminates these disadvantages by allowing the speed of the fans to be varied through a range of air-moving capacities. Unnecessary cycling or diversion of air is completely eliminated and the accompanying temperature over- and under-swings are greatly reduced. In addition, the single pump drive motor achieves greater efficiencies by minimizing losses associated with use of multiple drive motors.

BRIEF SUMMARY OF THE INVENTION

An electrical circuit includes a series of two timers which may be preset for varying length, repeated time cycles of from zero to several minutes. The first timer controls the period of time during which the system is either increasing or decreasing the speed of hydraulically operated ventilating fans. The second timer is used to select the duration of the time interval between adjustments in fan speed. When the first timer is activated, the flow of hydraulic fluid to the fan's hydraulic motors is increased or decreased depending upon the condition of a thermostat which compares the temperature of the air in the building to a desired preset temperature on the thermostat. If the temperature of the air in the building is too high, the electrical circuit acts to close a shunt flow divider valve controlled by an electrical valve-actuating motor. Closing the shunt flow divider valve increases the flow of hydraulic fluid to hydraulic motors driving the ventilating fans. The resulting increase in hydraulic fluid flow through the motors increases the speed of the associated fans thereby operating to reduce the ambient temperature of the air in the building.

Similarly, if the temperature of the air in the building is lower than the preset temperature, the electrical circuit acts to open the shunt flow divider valve thereby decreasing the flow of hydraulic fluid to the fan motors which reduces the fan speed to permit the temperature of the building to increase. Because the shunt flow divider valve can be progressively opened or closed along its entire range, the speed of the ventilating fans can also be progressively varied. In order to minimize overcompensation in temperature adjustment, and thereby to reduce total energy consumption, the second interval timer provides a limited delay between speed changes of the fan motors. This results in a step-wise adjustment in air flow, resulting in more accurate adjustments of temperature. Thus, the system quickly and efficiently adjusts the speed of the ventilating fans to maintain the air temperature desired.

DETAILED DESCRIPTION OF THE PREFERRED EMBODIMENT

Figure 1:
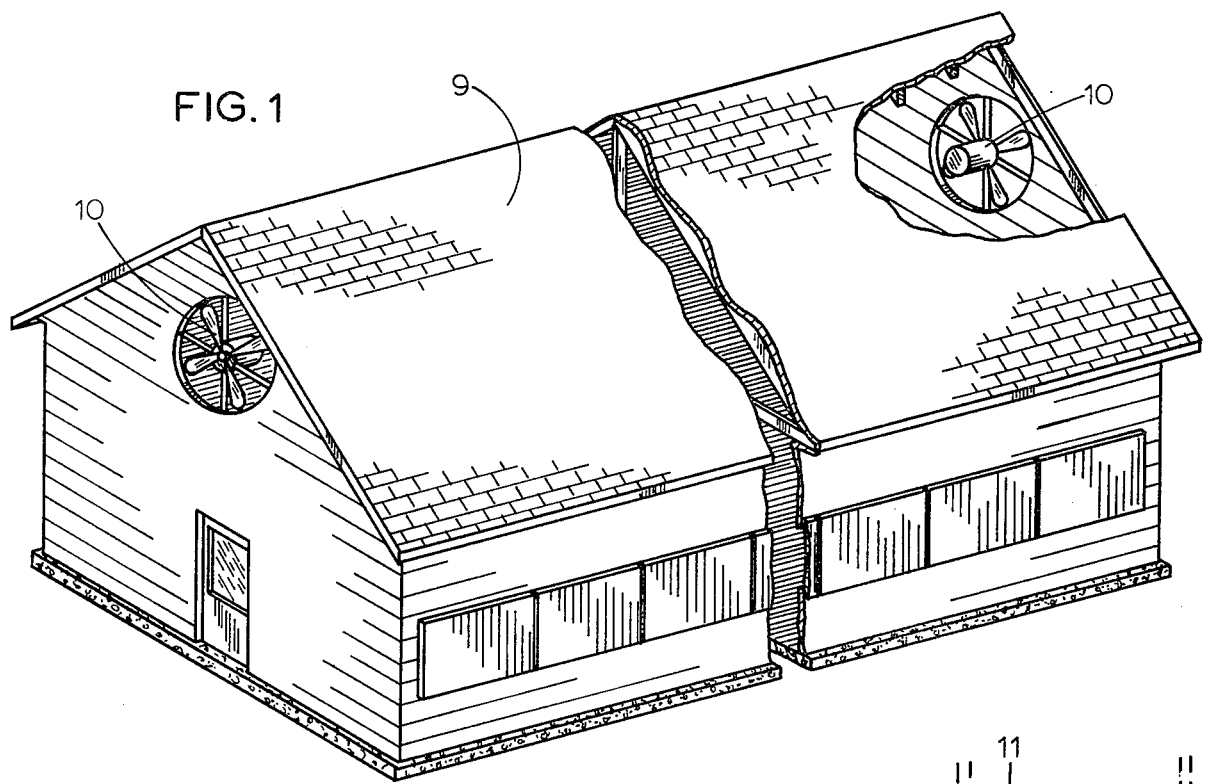
FIG. 1 is a perspective cutaway view of a confinement building with portions removed to show ventilating fans placed in opposite ends of the building.

A preferred embodiment of the present invention is shown in FIG. 1. Two hydraulic ventilating fans 10 are shown in communication with the atmosphere and placed at opposite ends of an animal confinement building 9.

Figure 2:
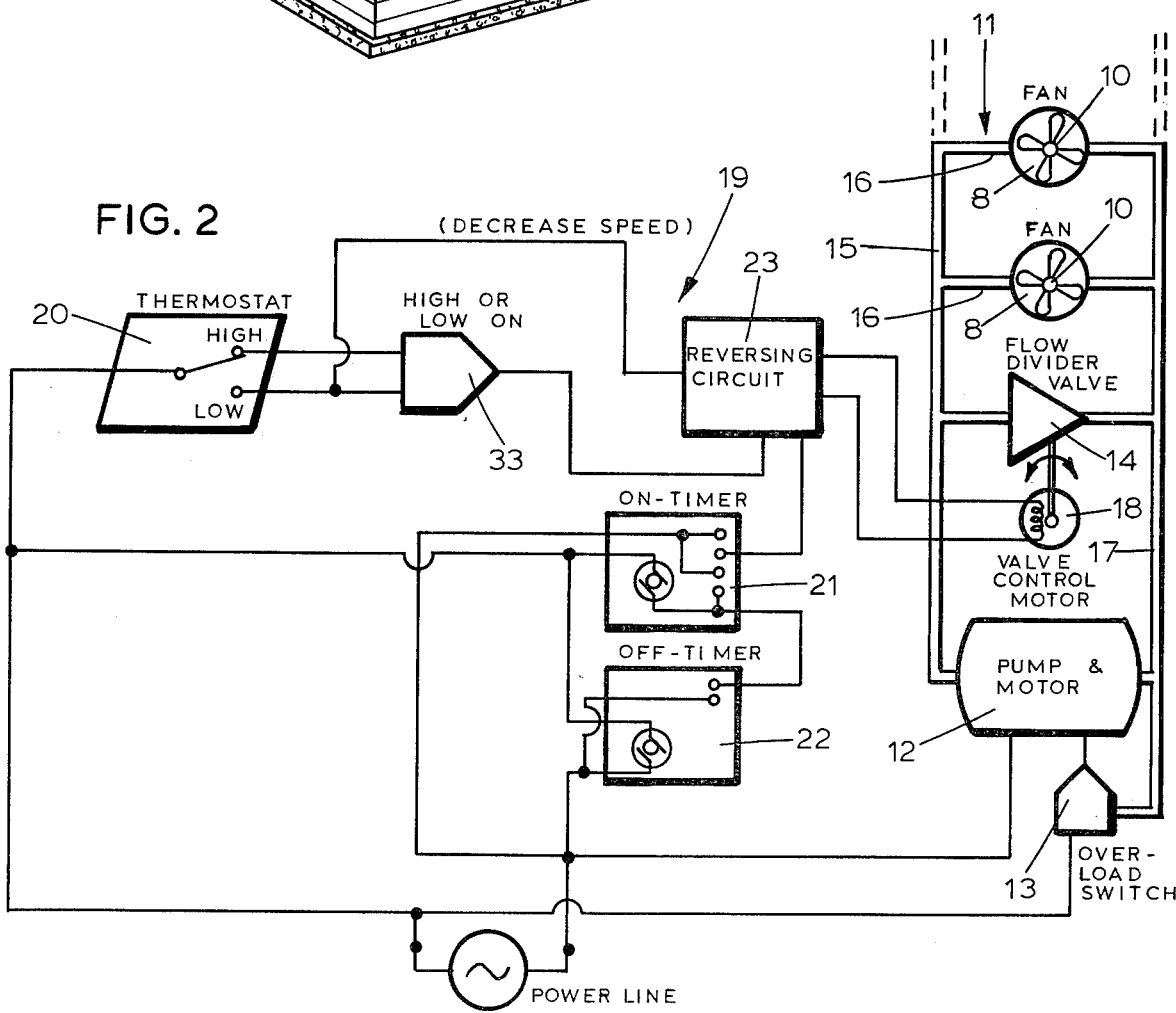
FIG. 2 is a schematic diagram of an electrical and hydraulic control circuit for use with a preferred embodiment of the invention.

The hydraulic flow circuit of the present invention, indicated generally in the schematic diagram of FIG. 2 at 11, includes a pump and motor unit 12 which provides pressure to circulate fluid throughout the hydraulic circuit 11. The pump and motor unit 12 is provided with an overload switch 13 which senses the hydraulic pressure in the hydraulic flow circuit 11 and prevents the pump and motor unit 12 from exceeding designed pressure limits.

Hydraulic fluid flows from the pump and motor unit 12 to fluid motors 8 for driving ventilating fans 10 and back to the pump and motor unit through fluid supply and return pipes 17 and 15. Fluid supply pipe 17 carries pressurized fluid from the pump and motor unit 12 to be delivered to the fluid motors 8, and fluid return pipe 15 returns fluid to the pump and motor unit 12. Fluid conducting pipes 16 deliver fluid to and from each fluid motor 8 from the fluid supply and return pipes 17 and 15. Interposed in shunt fashion between the fluid supply and return pipes 17 and 15 is a shunt flow divider valve 14. Accordingly, the fluid motors 8 and shunt flow divider valve 14 are connected in parallel with the pump and motor unit 12. Although the flow control valve 14 could be inserted in the fluid supply pipe 17 in a series fashion with regard to the fluid motors 8, a shunt, i.e., parallel, arrangement as shown in FIG. 2 has been found advantageous in the preferred embodiment.

With the shunt flow divider valve 14 completely closed, the entire flow of fluid is forced through the fluid motors 8, thereby rotating the ventilating fans 10 at maximum speed. When the shunt flow divider valve 14 is completely open, a minimum of fluid flows through the fluid motors 8, and the ventilating fans 10 operate at minimum speed.

The shunt flow divider valve 14 may be progressively opened and closed by an electrical valve control motor 18. The valve control motor 18 is part of an electrical control circuit generally designated in FIG. 2 at 19.

A thermostat 20 of the electrical control circuit 19 senses the ambient temperature of the air within the confinement building 9. The thermostat 20 consists of a temperature responsive switch with two contact points. If the temperature of the air in the confinement building 9 is higher than that selectively set on the thermostat 20, the temperature responsive switch makes electrical contact with the "high" contact, and a reversing circuit 23 will remain in a steady-state condition such that operation of the valve control motor 18 closes the shunt flow divider valve 14 thereby increasing fluid flow to the fluid motors 8 and increasing fan speed. If the temperature of the air in the confinement building 9 is lower than that selectively set on the thermostat 20, the temperature responsive switch makes electrical contact with the "low" contact, and the reversing circuit 23 will be reversed such that the operation of the valve control motor 18 opens the shunt flow divider valve 14 thereby decreasing fluid flow to the fluid motors 8 and decreasing fan speed. The thermostat may provide an "open" range in which neither contact is closed, thereby permitting one to set a "high" and "low" temperature separately. The following description, however, will describe a thermostat on which only a single temperature may be set.

The valve control motor 18 may consist of a multiple-winding reversible electric motor. Such a motor conventionally has three electrical contact leads; a neutral lead which is always in contact with the electrical supply, and two alternate winding leads which can be selectively and individually energized to drive the motor in either one direction or in the reverse direction. Yet another type of suitable motor has a reversible field winding for changing the rotational direction of the armature. Alternatively, the valve control motor 18 may consist of a direct current electric motor with a single winding and only two electrical contact leads. The direction of the single winding motor is reversed by reversing the polarity of the current applied to the two electrical contact leads.

Figure 6:
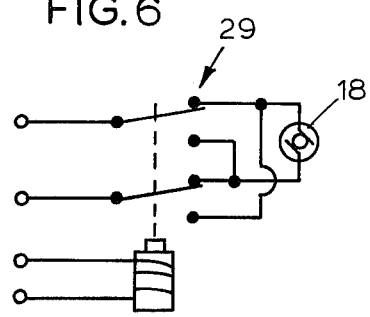
FIG. 6 is a schematic diagram of one type of reversing circuit used in association with a direct current valve control motor.

The reversing circuit 23 may consist of a double-pole, double-throw relay as generally designated at 29 in FIG. 6. If electric current is not flowing through the relay coil, the reversing circuit 23 is in its steady-state condition. In this condition, the reversing circuit 23 is connected to the valve control motor 18 so that current flowing through the reversing circuit 23 to the valve control motor 18 drives the valve control motor 18 in a direction to close the shunt flow divider valve 14. If the temperature of the air in the confinement building 9 is less than the temperature set on thermostat 20, current is supplied to the coil of relay 29 of the reversing circuit 23 which results in reversal of the current supply to the valve control motor 18. The valve control motor 18 then operates to open the shunt flow divider valve 14, and the speed of the ventilating fans 10 decreases as described above. This type of reversing circuit 23 is particularly suitable for operation with a valve control motor 18 having only two electrical contact leads.

Figure 7:
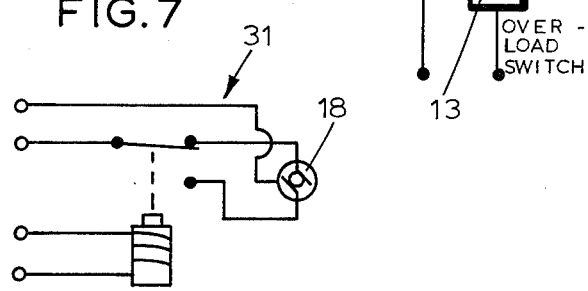
FIG. 7 is a schematic diagram of another type of reversing circuit used in association with a dual winding reversible valve control motor.

A design of the reversing circuit 23 which would effectively control a multiple winding type of valve control motor 18 would be comprised of a single-pole, double-throw relay as generally designated at 31 in FIG. 7. To decrease building temperature, current would not be supplied to the coil of relay 31, and the reversing circuit 23 would be in its steady-state condition. In this condition, current flowing through the reversing circuit 23 to the valve control motor 18 would drive the valve control motor 18 in a direction which would act to close the shunt flow divider valve 14. If the temperature of the air in the confinement building 9 is less than the temperature set on the thermostat 20, the coil of relay 31 of the reversing circuit 23 is energized, thereby resulting in current being supplied to the alternate winding lead of the motor. Valve control motor 18 will then rotate in the opposite direction, acting to open the shunt flow divider valve 14, thereby decreasing the speed of the ventilating fans 10.

As shown in FIG. 2, a high-low driver circuit 33 is interposed between the thermostat 20 and the reversing circuit 23. The high-low driver circuit 33 provides an output current level capable of driving the valve control motor 18 whenever the thermostat 20 indicates either a high or low ambient temperature.

Driving current is also supplied to the valve control motor 18 through operation of a series of two interval timers 21 and 22. The interval timers 21 and 22 consist of switches which are opened and closed in a cycle, the period of which can be adjusted through a range of from a few seconds to several minutes.

When timer 21 is closed, electric current is supplied through timer 21 to the valve control motor 18 which either opens or closes the shunt flow divider valve 14 depending upon the condition of the thermostat 20 and the reversing circuit 23. In the illustrated embodiment, once timer 21 has closed it remains closed until the period for which it is set has expired. In order to provide a period of time for the temperature of the air in the building to respond to fan speed changes, interval timer 22 operates to delay the initiation of a new period by timer 21, thereby also delaying changes in fan speed for the period during which timer 22 is open. It is necessary for timer 22 only to provide an initiation pulse to timer 21 in order to begin another adjustment cycle.

The periods of timers 21 and 22 may be varied to conform with the size of the building and anticipated fluctuations in temperature. In the illustrated embodiment, when timer 21 is open, the speed of the ventilating fans 10 remains constant and when timer 21 is closed, the speed of the ventilating fans 10 either decreases or increases.

Figure 3:
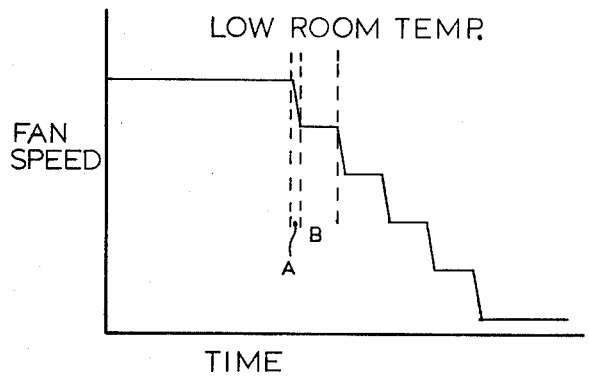
FIG. 3 is a graphical representation of the stepwise decrease in the ventilating fan speed with time when the building temperature is lower than that selected.
Figure 4:
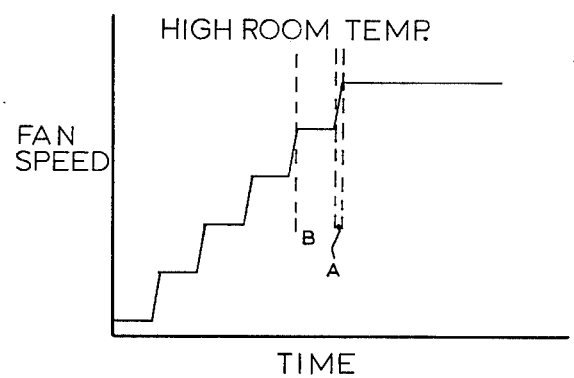
FIG. 4 is a graphical representation of the stepwise increase in the ventilating fan speed with time when the building temperature is higher than that selected.

This incremental increasing or decreasing of fan speed results in a stepwise variation over time in the speed of the ventilating fans 10 as depicted graphically in FIGS. 3 and 4. As illustrated in FIGS. 3 and 4, an ambient temperature lower or higher than that set on the thermostat results in a stepwise decrease or increase in fan speed over time. In the figures, the period during which changes are made is represented by a distance A on the time axis, and the period during which no change is made is represented by a distance B. The distance A on the time axis is determined by the period set on interval timer 21, and the distance B is determined by the period set on interval timer 22 (see FIG. 2).

In normal usage of the system, timer 21 would be set to a substantially shorter period than timer 22 in order to provide rather slight changes in fan speed followed by substantial periods for building air temperature to react to the change, thereby limiting undesirable "overshooting" of the temperature adjustment in the building.

Figure 5:
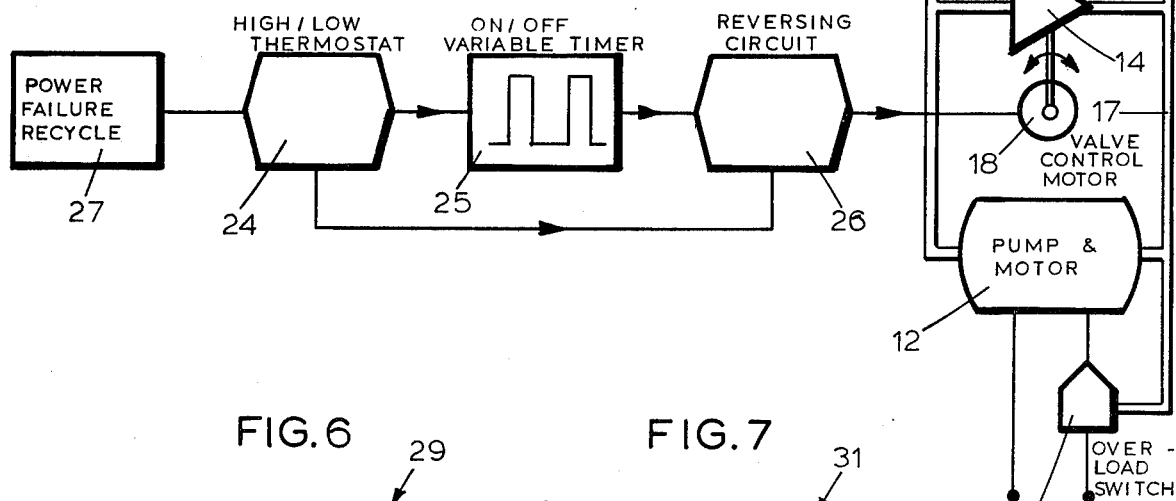
FIG. 5 is a block diagram of the electrical control circuit in association with a schematic diagram of the hydraulic flow system.

A more general, block diagram of the electrical control circuit 19 is shown in FIG. 5, which includes a high-low thermostat 24, a on-off variable timer 25, and a reversing circuit 26. Also shown in FIG. 5 is a power failure recycle circuit 27 which acts to reset the shunt flow divider valve 14 to a fully open position following a power failure so that the system does not attempt to resume full speed ventilation immediately upon the resumption of electrical power. In a preferred embodiment of the invention the power failure reset circuit causes the thermostat 24 to indicate a false "low" signal for a sufficiently long period of time prior to starting the pump and motor unit 12 to permit the valve control motor 18 to fully open the shunt flow divider valve 14.

It should be clear from the foregoing description of the preferred embodiment that other mechanical or electrical means could be employed in accomplishing the broad purposes of the invention. It should be understood this description is intended to illustrate but not limit the scope of the invention as defined in the following claims.

I claim:

1. A ventilating system for a building having at least one fan for moving air within the building, said system comprising;
   (a) fluid motor means for driving each said fan and corresponding in number to the number of said fans,
   (b) means for supplying fluid under pressure to said fluid motor means,
   (c) valve means interposed in said supplying means for variably controlling the flow of fluid to said fluid motor means,
   (d) motive means for incrementally opening and closing said valve means, and
   (e) temperature sensing means responsive to the temperature of the air within said building, when said temperature varies beyond a predetermined temperature degree range to actuate said motive means to progressively increase the fluid flow to said fluid motor means for sequential time increments during a time period in which said temperature exceeds said temperature degree range and to progressively decrease the fluid flow to said fluid motor means for sequential time increments during a time period in which said temperature is less than said temperature degree range.

2. A ventilating system as defined in claim 1, wherein each said fan communicates with the atmosphere outside the building.

3. A ventilating system as defined in claim 1, wherein said fluid supply means is a single pump unit.

4. A ventilating system as defined in claim 1, wherein said valve means is comprised of a rotatable flow divider valve.

5. A ventilating system as defined in claim 1, wherein said motive means opens and closes said valve means in discrete incremental steps occurring during timed periods.

6. A ventilating system for a poultry or livestock confinement building having a plurality of fans for moving air within the building, said system comprising:
   (a) fluid motor means for driving each said fan and corresponding in number to the number of said fans;
   (b) means for supplying fluid under pressure to said fluid motor means including a single pump unit;
   (c) reversible valve means interposed in said supplying means for variably controlling the flow of fluid to said fluid motor means, said valve means comprised of a rotatable flow divider;
   (d) motive means for incrementally opening and closing said valve means in discrete steps comprising sequential timed intervals;
   (e) a thermostat for providing an indication when the temperature of the air in said building exceeds or falls short of a predetermined temperature; and
   (f) means associated with said thermostat for actuating said motive means to progressively increase the fluid flow to said fluid motor means for sequential time periods during which said air temperature exceeds said predetermined temperature and to progressively decrease the fluid flow to said fluid motors for sequential time periods during which said air temperature is less than said predetermined temperature.

7. A ventilating system as defined in claim 6, wherein said fans communicate with the atmosphere outside the building.

8. A ventilating system as defined in claim 6, wherein said reversible valve means comprises a shunt flow valve interposed in parallel with said fluid motor means.

9. A ventilating system as defined in claim 6, wherein said thermostat accommodates a preset temperature degree range for which an indication is made only when said air temperature exceeds or is less than said preset temperature degree range.

* * * * *